Jan. 24, 1939. W. H. SAGSTETTER 2,144,730
BOXCAR
Filed June 30, 1938 3 Sheets-Sheet 1
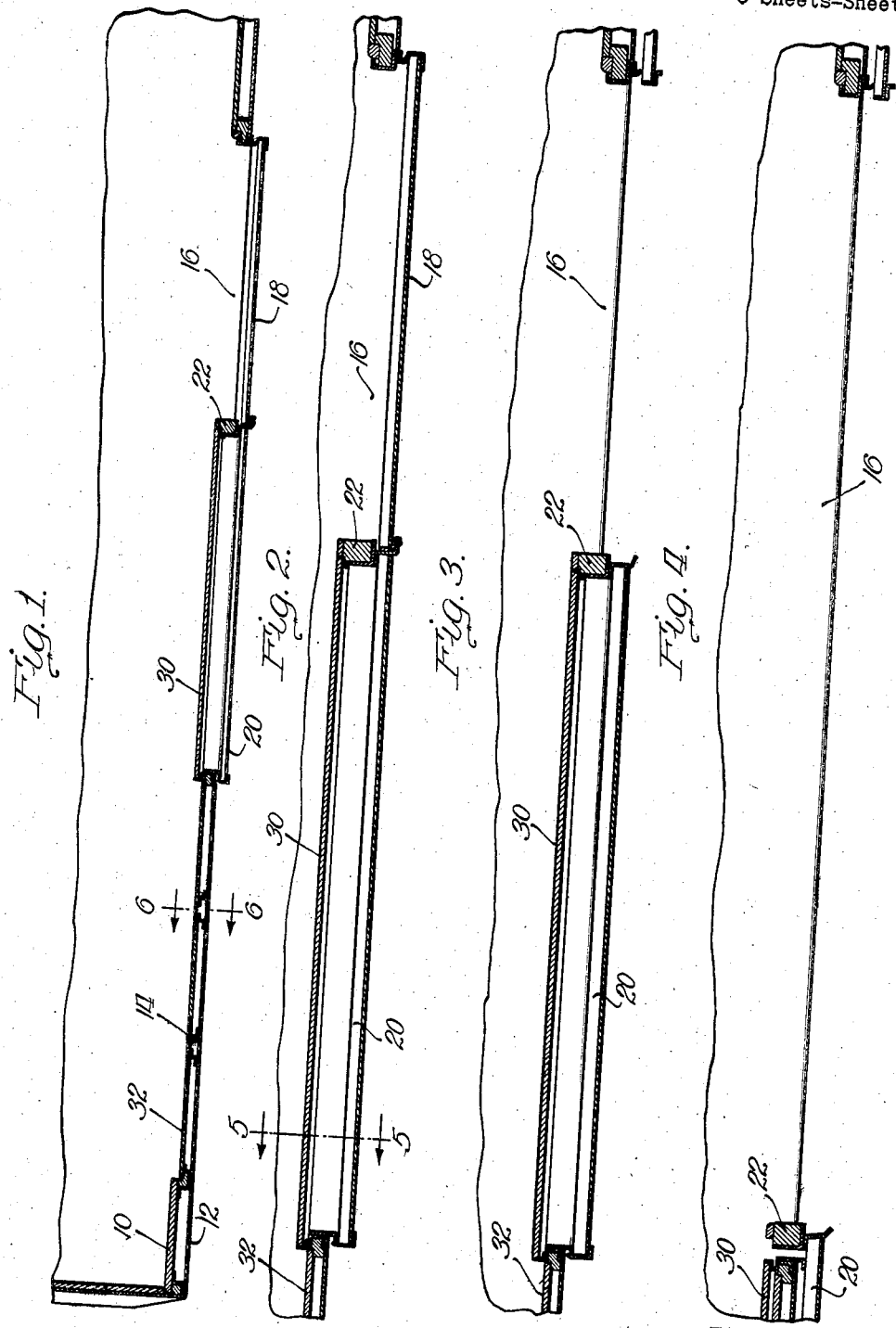
Inventor:
William H. Sagstetter
By: Richard Spencer
Atty.

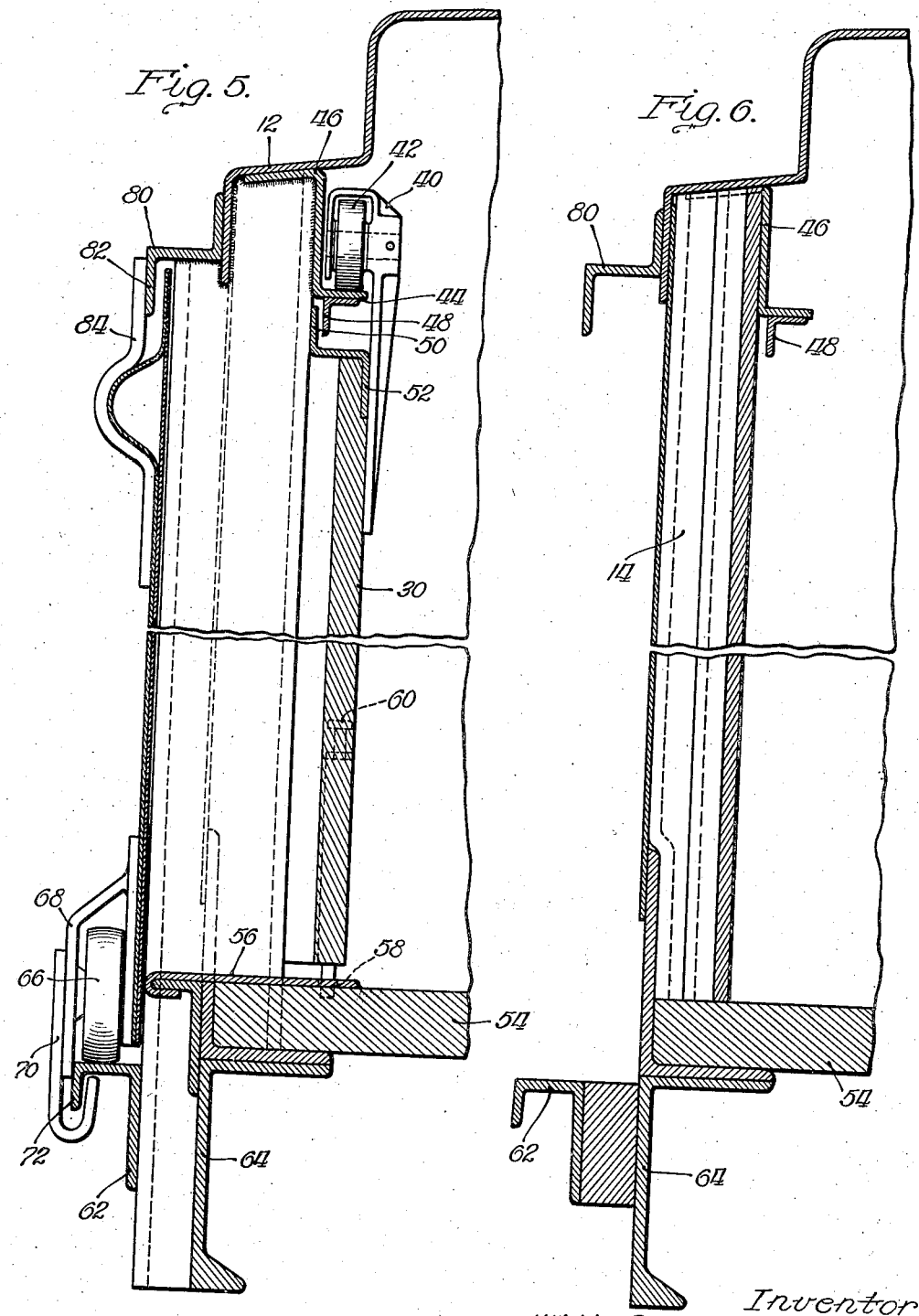

Jan. 24, 1939.  W. H. SAGSTETTER  2,144,730
BOXCAR
Filed June 30, 1938   3 Sheets-Sheet 3
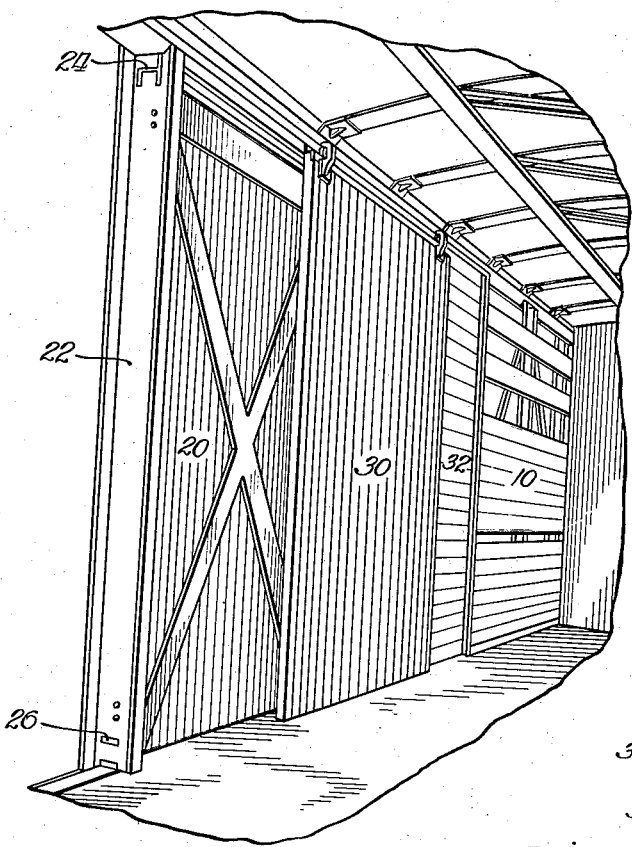
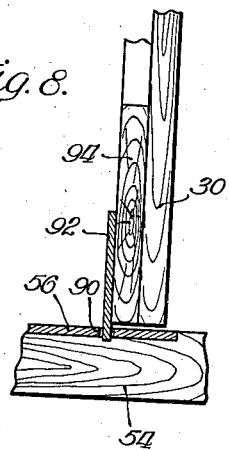
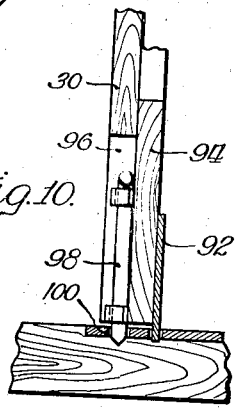
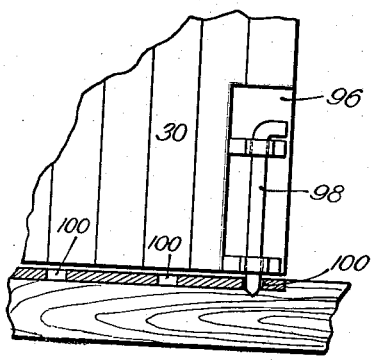
INVENTOR.
William H. Sagstetter
BY
ATTORNEY.

Patented Jan. 24, 1939

2,144,730

UNITED STATES PATENT OFFICE 2,144,730

BOXCAR

William H. Sagstetter, Denver, Colo.

Application June 30, 1938, Serial No. 216,647

4 Claims. (Cl. 20—22)

This invention relates to box cars, and more particularly to box cars embodying double door constructions which permit the car to serve either in the transportation of grain or the carriage of automobiles.

In loading automobiles it is customary to provide a box car with an approximate fourteen-foot opening in the side which is closed by a suitable door or doors. On the other hand, in grain cars it is customary to provide a six-foot opening and to cover it by a suitable sliding door. For years it was common practice to provide separate cars for each of these purposes and no provision was made for using the same car interchangeably for both. However, years ago the proposal was made to provide convertible cars which would be adapted for either purpose, and to this end the so-called double door construction was designed. In accordance therewith the box car was provided with an approximate fourteen-foot opening and two sliding doors were hung on the outside of the car body to close this opening. One of the doors was approximately eight feet wide and the other six feet, and the wider door, which may be termed the automobile or supplemental door, carried a post or jamb which permitted this door to be locked in closed position. In operation, when the car was used for the transportation of automobiles or other sizeable merchandise both doors were used, affording a wide entrance to the car. However, when the car was used for the transportation of grain or other small merchandise the supplemental or automobile door was rigidly bolted in position by means of the door post or jamb which was fixedly secured to its leading edge, and in this condition only the standard or grain door, six feet in width, was employed during the loading and unloading. Thus, by closing the automobile or supplemental door, and perhaps by reinforcing the door with sheathing or planking nailed between the post and the lining in the rear of the door it was possible to use the car for grain purposes, and as so conditioned the standard grain door was the only one used.

Numerous objections arose in connection with the planking or sheathing that it was necessary to supply in order to properly reinforce the automobile or supplemental door and accordingly it has heretofore been proposed to mount an inner auxiliary door in the rear of the supplemental or automobile door and to close the inner auxiliary door when using the car for the shipment of grain or other small merchandise. Doors that have previously been provided for this purpose are subject to numerous objections which need not be discussed in detail at this point. Generally speaking, however, they are so mounted as to form obstructions in the loading of the car, or in other ways they fail to satisfy commercial requirements.

An important object of the present invention is the provision of a novel and improved inner auxiliary door of the type referred to which may be easily and economically constructed and mounted within the car in such a manner that it will not interfere in any way with the loading of the car or the standard specifications and requirements thereof.

An important feature of the present invention which contributes to the accomplishment of the recited object resides in forming a recess within the inner lining of the car within which the auxiliary door fits when in open position, in such a manner that the effective width of the car is not decreased and the inner face of the auxiliary door when so positioned lies flush with the inner lining of the car and forms a substantially continuous, uninterrupted surface therewith.

Another feature of the invention which contributes to the accomplishment of the recited object consists in the manner in which the inner door is mounted for movement from an open to a closed position. Another feature resides in the provision of a track arrangement of a particular construction over which the door moves as it is being opened and closed, and still a further feature resides in the provision of a latch means in combination with such a door for locking the same at any desired degree of closure.

Other objects and features of the invention will become apparent from a reading of the following specification in the light of the accompanying drawings in which Figure 1 is a schematic top plan view of a box car in section showing the double doors and the inner auxiliary door constructed in conformity with the present invention;

Figure 2 is a view similar to Figure 1 but slightly enlarged;

Figure 3 is a view similar to Figure 2 with the box car door or the grain door shown in open position, and the supplemental automobile door, as well as the inner door, shown in closed position;

Figure 4 shows all of the doors in open position;

Figure 5 is a vertical section taken along the line 5—5 of Figure 2;

Figure 6 is a view in section taken along the line 6—6 of Figure 1;

Figure 7 is a view in perspective of the interior of a box car constructed in accordance with the present invention; and Figures 8, 9 and 10 comprise detailed views of the auxiliary door mounting and the latching mechanism therefor.

As previously stated, it was customary for years to provide separate types of cars for the shipping of grain and automobiles. This was done because the shipping of grain required a door construction of one size and the shipping of automobiles a door construction of an entirely different size. Subsequently it was proposed to provide a box car with a plurality of doors which would permit the car to be used for either the shipment of grain or automobiles, according to the number of doors that were used. Thus, one of the plurality of doors could be used for the shipment of grain and two or more for the shipment of automobiles. This permitted doors of different widths to be afforded in this special type of box car.

The present invention relates to this convertible type of car, and as shown in Figure 1 a box car having a wooden inner lining 10 and steel outer sheathing 12 suitably spaced therefrom by means of angular reinforcements 14, has an approximate fourteen-foot opening 16 in its side. This size opening is for automobile cars, whereas a six-foot opening is standard for grain cars. As illustrated in Figures 1 to 4, inclusive, the wide opening in the car is closed by a plurality of doors comprising a box or grain car door 18 of standard design, six feet in width, and a supplemental or automobile car door 20 which is approximately eight feet in width. Together these two doors close the approximate fourteen-foot opening and they are hung on the exterior of the box car body in any suitable manner to move toward and away from one another.

In order to lock the supplemental or automobile car door in closed position during the time the box car is used for the shipment of grain a post or jamb 22 of suitable design and construction is rigidly affixed to the forward extremity of this door and as shown in Figure 7, is provided at its upper and lower portions with devices 24, 26 for locking the post and door in closed position. In this connection it is pointed out that although Figures 1 to 6, inclusive, of the drawings show the door as made of steel, as shown in Figure 7 it is made of wood, and accordingly, if there appear to be any variations between the different figures it is because of this difference of material. Of course the invention is in no wise restricted either to wooden cars or steel cars, and contemplates use in connection with both.

Thus, from as much of the description as has just been given it will be appreciated by reference to Figures 1 to 4, inclusive, that the approximate fourteen-foot opening may be made available for loading purposes as illustrated in Figure 4 by opening both doors, and in this condition the door post 22 has been moved to the left by reason of the fact that it is rigidly affixed to the door 20. In Figures 1 and 2 the doors are shown completely closed, the position that they will occupy during shipment of any merchandise, either small or large. In Figure 3 the supplemental or automobile car door is shown in closed position whereas the box or grain car door is shown in open position, in which condition the car is adapted for the loading or unloading of grain or other small sized merchandise.

As stated at the outset of this specification, the invention herein is concerned with the provision of a third or inner auxiliary door mounted in the rear of the automobile or supplemental door 20, the purpose of the inner door being to block off the supplemental door 20 when the car is used for the shipment of grain and other merchandise. As shown in Figures 1 to 4, inclusive, the inner auxiliary door is indicated by the reference numeral 30, and when in use may be moved to the left of the position shown in Figure 1 to occupy the position shown in Figure 4, in which condition the door 30 lies within a recess 32 formed within the inner wall or lining of the car. The depth of the recess 32 depends upon the thickness of the door 30 so that when the door 30 is in open position, as shown in Figure 4, the inner face or wall of the door lies flush with the lining or inner side wall of the car body, forming a substantially uninterrupted surface. Thus, the lining or inside face of the car body and the inner side of the door 30 are flush with one another, in which condition the car may be loaded without hindrance and indeed at no time does the door form an obstruction within the loading area of the car. In this manner the standards of the A. A. R. are at all times complied with.

In Figure 7 the auxiliary door 30 is clearly illustrated, as likewise are the recess 32 and the inner lining 10 of the car body. As shown in this figure, the automobile door 20 is in a closed position and the inner auxiliary door 30 is only partially closed.

Turning now to the manner in which the inner door is mounted, Figure 5 shows its construction in a steel car, with wood lining, whereas Figure 7 shows its construction in a steel car with wood sheathing and lining. Turning first to Figure 5, the auxiliary or inner door 30 has affixed to its upper marginal portions a plurality of overhead hangers 40 which carry rollers 42 adapted to ride upon a horizontally extended portion 44 of a door lintel 46. The under side of the horizontally extending portion 44 is provided with a downwardly extending angular retaining member 48 which overlies a vertically extending portion 50 of a door frame member 52 which extends upwardly from the inner door 30. Thus, in operation, the inner door 30 may be moved back and forth and the rollers 42 will move over the track 44 formed on the door lintel 46.

At the bottom of the inner door the floor boards 54 of the car are provided with a threshold plate 56, which in turn is equipped with a series of apertures 58 adapted to be engaged by a retractible locking or latching bolt 60 carried by the rear edge of the inner door. In this manner and by this provision the inner door may be locked in any desired position of closure. The outer doors, both the supplemental automobile door and the standard box car door, are mounted in a manner that may be illustrated by referring to Figure 5. As there shown, a track 62 of angular section is supported either directly or indirectly by the side sills 64 of the car and is adapted to support a plurality of bottom rollers 66 secured by hangers or housings 68 to the bottom of the outside steel door, which may be the outer door 20 or 18, as the case may be. Thus, the doors are, as illustrated, bottom hung, and the bottom rollers 66 are maintained in engagement with the track 62 by means of retaining members 70 which engage with the rear faces of a vertical flange 72 formed on the track.

At its upper extremity the door is mounted in the manner now to be described. The outer sheathing 12 of the car body carries a longitudinal retaining member 80 of the Z-bar type which is provided with a vertical flange 82. The door plate is mounted in the rear of the vertical flange 82 and a plurality of supporting brackets 84 are positioned on the front side of the door and engage the outer face of the vertical flange 82, thus cooperating with the door plates in maintaining the upper extremity of the doors in assembled position.

Also, as shown in Figure 7, the inner auxiliary door 30 of either wood or steel construction, or combination wood-steel construction, with which the present invention is concerned, is supported by means of overhead rollers and hangers, although without departing from the true scope of the invention the rollers might be positioned at the bottom of the door in a manner well known in the art. In order to guide the bottom of the door during its movement from open to closed or intermediate positions, the wooden floor 54 of the car is provided with the threshold plate 56 in which is formed a slot or guideway 90 adapted to receive a guide plate 92 mounted on the door frame 94 and adapted to project below the bottom of the door in the manner illustrated. By this arrangement a tight, grain-proof seal is maintained between the inner door and the floor of the car, and additionally the door is properly guided during its movement between open and closed positions.

It has previously been stated that the inner door is provided with means for latching it in various positions of closure, and to this end there is provided the arrangement shown in Figures 9 and 10. As therein illustrated, the inside door 30 is provided with a cut-away portion 96 to receive a vertically movable latch or bolt member 98 adapted to engage within one of a series of apertures 100 formed within the threshold plate 56. By means of this device the inner door may be latched in any desired position of adjustment.

In closing this description it is to be appreciated that various modifications in design and construction may be made by those skilled in the art without in any way departing from the scope of the invention as outlined herein and indicated by the following claims.

Having thus described the invention, what I claim as new and desire to secure by Letters Patent of the United States is:

1. An automobile box car of the type described, having a double door construction and an auxiliary inner door, the inner face of the inner door being adapted to fit within an open sided offset formed within the inner lining of the car body when in open position with the inner face of said door forming a continuation of the inner lining of said car.

2. A box car construction of the character described, comprising, in combination, an inner lining, an open sided offset formed in the inner lining, said offset being exposed to the interior of the car, a door mounted on the exterior of the car, and an auxiliary door mounted on the interior of the car, said auxiliary door being adapted to occupy said offset when in an open position whereby the inner face of the auxiliary door forms a continuation of the inner lining of said car.

3. A box car construction of the character described, comprising, in combination, an inner lining, an open sided offset formed in the inner lining, said offset being exposed to the interior of the car, a door mounted on the exterior of the car, and an auxiliary door mounted on the interior of the car, said auxiliary door being adapted to occupy said offset when in an open position, the depth of said offset being substantially equivalent to the thickness of said door whereby the inner face of the auxiliary door forms a continuation of the inner lining of said car when said auxiliary door is in an open position.

4. A box car construction of the character described, comprising, in combination, a double door arrangement on the exterior of the car, an overhung auxiliary door mounted interiorly of the car, and an open sided offset within the car lining within which the auxiliary door is adapted to be received when in open position whereby the inner face of the door in open position forms a continuation of the lining of said car.

WILLIAM H. SAGSTETTER.